J. P. ROE.
MEANS FOR PROTECTING SHIPS.
APPLICATION FILED AUG. 11, 1919.
1,338,530.
Patented Apr. 27, 1920.
3 SHEETS—SHEET 1.
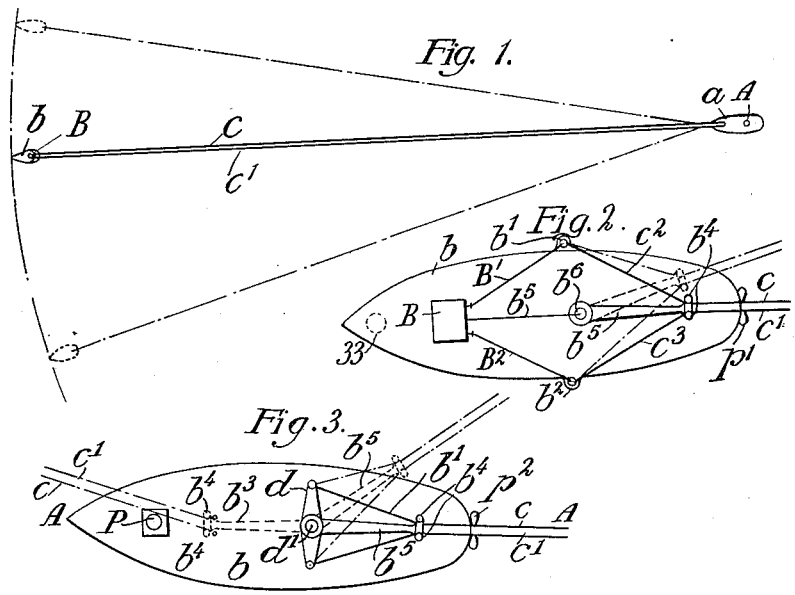
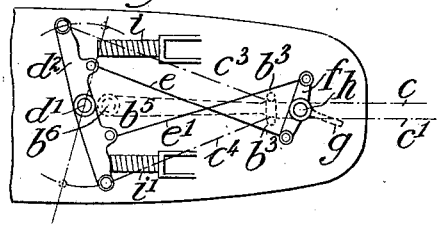
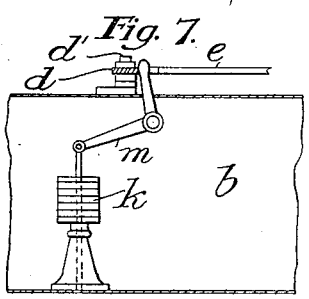
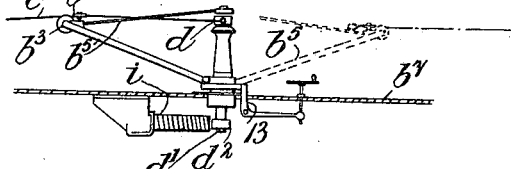
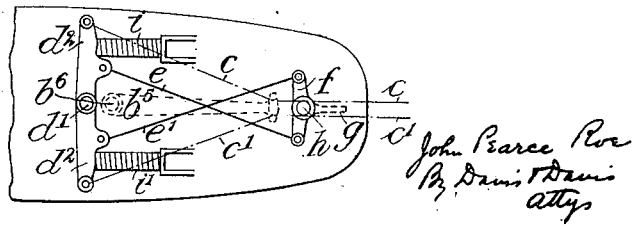

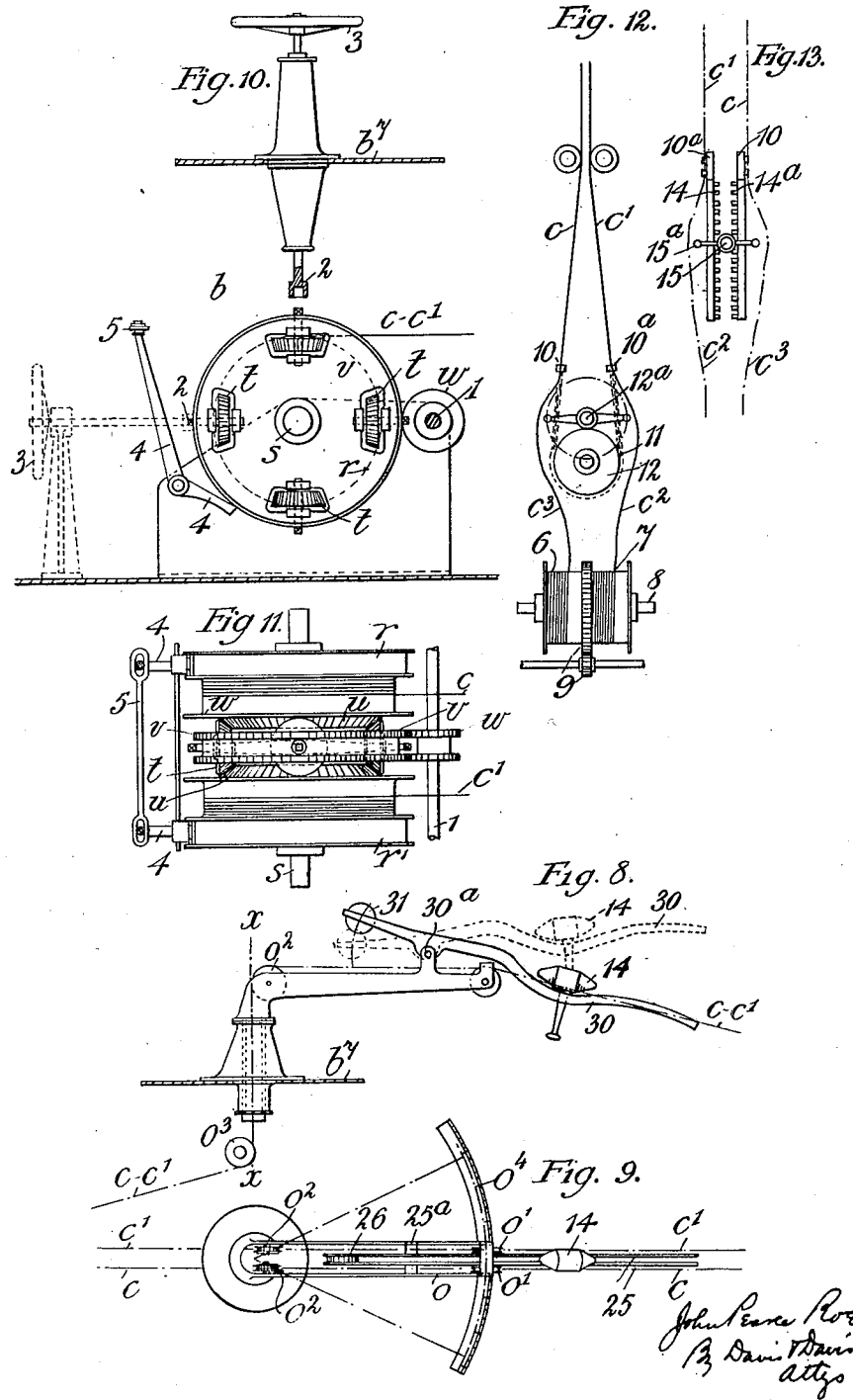

J. P. ROE.
MEANS FOR PROTECTING SHIPS.
APPLICATION FILED AUG. 11, 1919.
1,338,530.
Patented Apr. 27, 1920.
3 SHEETS—SHEET 3.
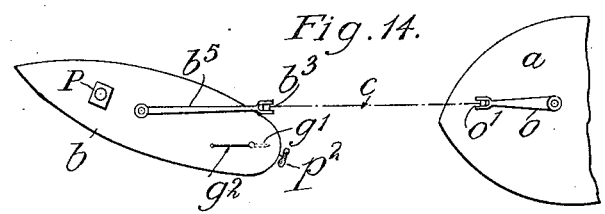
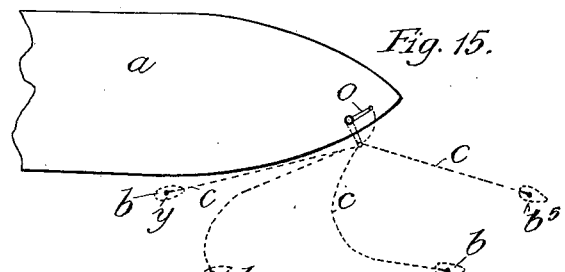
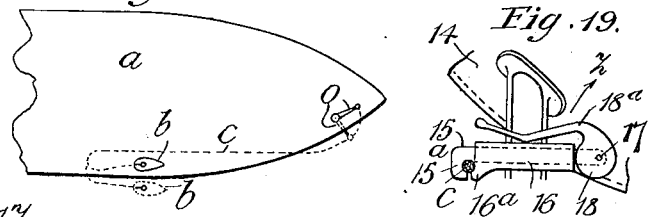
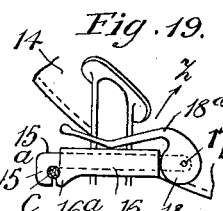
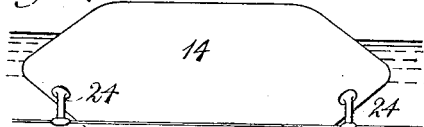
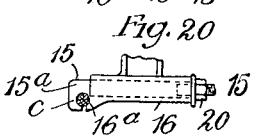
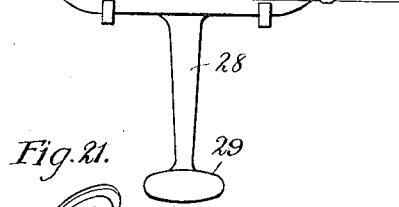
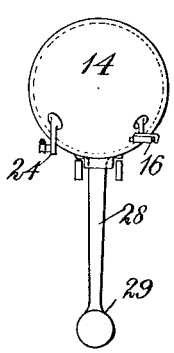
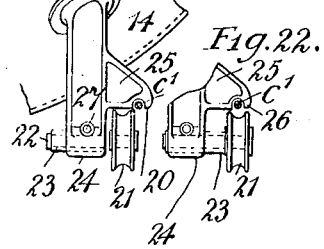

UNITED STATES PATENT OFFICE.

JOHN PEARCE ROE, OF LONDON, ENGLAND.

MEANS FOR PROTECTING SHIPS.

1,338,530.    Specification of Letters Patent.    Patented Apr. 27, 1920.

Application filed August 11, 1919. Serial No. 316,801.

*To all whom it may concern:*

Be it known that I, JOHN PEARCE ROE, a subject of the King of Great Britain and Ireland, residing at South Place, in the city of London, England, have invented Improvements in Means for Protecting Ships, of which the following is a specification.

This invention has reference to that kind of means or apparatus for the protection of a ship at sea wherein an advanced craft or pilot boat (hereinafter called for distinction the pilot craft) is connected to and caused to travel in advance of or partly around the ship (hereinafter called for distinction the parent ship) and to tend to travel faster than the parent ship so as to put tension on the flexible connecting means between them; wherein the pilot craft is provided with means for giving a warning or indication on the parent ship when approaching shoal water, or the shore, or an obstacle ahead of the ship's course, or ahead of the ship when it is at rest; and wherein means are provided for altering the course of the pilot craft and for indicating the position of the pilot craft in relation to the parent ship when the pilot craft cannot be seen, as during darkness or in a fog.

The present invention has reference to improvements in means or apparatus of the kind referred to and in particular to provide improved means for steering or altering the position of the pilot craft relatively to the parent ship and also for indicating the position of the pilot craft in relation to the parent ship.

In means or apparatus according to the invention, the pilot craft may be propelled by power supplied from the parent ship, in which case no person need be on it. In this case the pilot craft will not only be driven from the parent ship but will also be steered or controlled from that ship through a pair of connecting and controlling lines or cables, hereinafter called the cables, the energy, preferably electrical energy, used for propelling the pilot craft being supplied through the cables, or it may be through separate cables. Or the pilot craft may be designed to carry one or more persons for steering or maneuvering it in accordance, it may be, with instructions received from the parent ship. In this case, the pilot craft can be connected to the parent ship by a single cable. The power for propelling the pilot craft may in this case be supplied from the parent ship as in the first case, but in order to keep down the weight of the connecting means between the parent ship and pilot craft, it may in certain cases be found more advantageous to provide the pilot craft with its own power generating plant, as for instance with one or more internal combustion engines. In this case, the function of the cable, which can be made light and of high tensile strength, is for regulating the distance between the parent ship and pilot craft. Two cables may however be used with such a pilot craft provided with its own power generating plant, in which case the steering and maneuvering of the pilot craft can be effected from the parent ship. In this case also the two connecting cables can be made lighter than when power has to be transmitted through them to the pilot craft.

In each case, the parent ship is provided with a swing arm over or through the outer end of which the connecting cable or cables pass or passes and which is free to turn about a vertical axis and respond to the direction of the pull of the cables or cable. A similar swing arm is provided on the pilot craft over or through the outer end of which the cables or cable pass or passes. The swing arm on the parent ship serves to indicate the position of the pilot craft relatively to the parent ship. The swing arm on the pilot craft serves, when a steersman is on this craft as an indicator to enable him to avoid any risk of the pilot craft being veered unduly relatively to the direction of the connecting cables or cable to the parent ship, or of its being inadvertently rounded back on the parent ship.

The nature and method of application of the invention will be more clearly understood from the following description thereof, aided by the accompanying drawings, wherein Figure 1 shows in plan, one arrangement of ship protecting means according to the invention in which the pilot craft is steered from the parent ship. Figs. 2 to 5 inclusive show, diagrammatically, in plan, various steering arrangements suitable for use with the arrangement shown in Fig. 1. Fig. 6 shows part of a pilot craft in vertical section corresponding to the line A A of Fig. 3, with the steering mechanism in side elevation. Fig. 7 is a similar view to Fig. 6 showing a modified arrangement. Figs. 8 and 9 show respectively in side elevation and plan, cable guiding and direction indicating means on the parent ship. Fig. 10 shows in end elevation with one of the winding drums removed and Fig. 11 in plan, mechanism on the parent ship for operating the steering arrangement shown in Figs. 2 to 7 inclusive. Figs. 12 and 13 show in plan, alternative constructions of mechanism for operating the steering arrangements. Fig. 14 shows, diagrammatically, in plan, an arrangement of ship protecting means according to the invention, in which the pilot craft is connected to the parent ship by a single cable, associated with a swing arm on the pilot craft and on the parent ship, the steering of the pilot craft being intended to be effected by a steersman on such craft. Figs. 15 and 16 are plan views of the parent ship and pilot craft hereinafter referred to.

Figs. 17 and 18 show respectively in side elevation and end elevation, a float associated with a pair of connecting cables for supporting the same. Fig. 19 shows in end view and to a larger scale than Figs. 17 and 18, one of the cable clamping devices. Fig. 20 shows a modified form of cable clamping device. Figs. 21 and 22 show in end elevation another arrangement of cable supporting devices for use with the float. All the figures are more or less diagrammatic.

The protecting means for the parent ship $a$ shown in Figs. 1 and 2 comprises the pilot craft $b$ arranged in advance of and connected to the parent ship by two cables $c$, $c^1$. The parent ship is equipped with power generating plant indicated at A and the pilot craft has a motor or motors indicated at B for driving in any known or suitable manner, a propeller or propellers actuated by power supplied through the cables $c$, $c^1$ or one of them from the parent ship, the power particularly applicable for this purpose being electricity transmitted through electric conductors $B^1$ and $B^2$ extending through the cables and connected to the motors at B. The distance between the parent ship $a$ and the pilot craft $b$ may conveniently be regulated by coiling the cables on drums on the parent ship. Sufficient power is transmitted to the pilot craft to cause it to travel faster, if free, than the parent ship and thus keep the desired amount of tension on the connecting cables $c$, $c^1$.

The steering or maneuvering of the pilot craft $b$ is, in this case, effected mechanically by the aid of the two cables $c$, $c^1$ which may come approximately together on the parent ship and on the pilot craft, these cables, after passing over or through the outer end of the swing arm on the pilot craft, having their forward portions $c^2$, $c^3$ splayed apart and connected to attachments $b^1$, $b^2$ on the pilot craft $b$ (see Fig. 2). In its simplest form (Fig. 2), this arrangement of the cables practically puts the pilot craft in bridles, so that if one cable be slacked and the other tightened in any convenient way, and as hereinafter described, a corresponding movement will be produced on the pilot craft $b$ which will thereby be veered from its previous course. An amplification of this arrangement consists, as shown in Fig. 3, in attaching the splayed portions of the cables $c$, $c^1$ to a lever $d$, or its equivalent, on the pilot craft $b$, the said lever being fixed to a vertical spindle $d^1$. To this spindle is also fixed another lever $d^2$ (see Fig. 4) or its equivalent, that is connected, as by crossed rods $e$, $e^1$, or other known mechanism, to the tiller head $f$ and rudder $g$ so as to operate the same, when it is moved in either direction about the center of the spindle $d^1$. The lever $d^2$, rods $e$, $e^1$, tiller head $f$ and rudder $g$ which will usually be below the deck $b^7$ of the pilot craft, are omitted from Fig. 3, for the sake of clearness. The effect of the arrangement described is such that if one of the cables $c$ or $c^1$ be hauled in and the other paid out, the levers $d$ and $d^2$ will be moved and with them the rudder $g$, with the result that the course of the pilot craft $b$ will be deviated, but as the craft swings or veers around, there will be an automatic correcting movement of the rudder that will prevent the pilot craft swinging more than a predetermined number of degrees out of her previous course. In other words, a given movement of the steering mechanism on the parent ship for operating the cables $c$, $c^1$ will give a corresponding and predetermined amount of helm to the pilot craft $b$ but as the pilot craft swings in answer to her rudder any undue continuation of this action will, by reason of the arrangement adopted, be corrected by the tendency of the pilot craft to bring the helm back amidship again. Instead of allowing the levers $d^1$, $d^2$ to work freely, except for rudder resistance, springs $i$, $i^1$ may be associated with said lever, as shown in Figs. 4, 5 and 6, of any desired strength, so that the first action on the levers $d$, $d^2$ of the cable $c$ or $c^1$ that is hauled in, will be to tend to pull the pilot craft $b$ over to port or starboard, as the case may be, without any rudder action whatever, and only when the resistance of the corresponding spring $i$ or $i^1$ is overcome, will the rudder action come into play. The arrangement of the springs $i$, $i^1$ is such, that only one will be acting on the corresponding side of the lever $d^2$ at a time when the lever is moved from its initial or normal position. The springs may be of the compression type as shown. In lieu of springs it is obvious that balance weights could be employed as shown in Fig. 7 where one such weight $k$ acted upon by the oscillating arm $d$ through a bell crank lever $m$, is shown. It is furthermore apparent that such an arrangement can be adapted for use with a rudder placed in any suitable position on the pilot craft, being shown applied to a stern rudder. Also, that the pilot craft $b$ can be driven by a propeller or propellers arranged in any suitable part of the pilot craft, a stern propeller $p^1$ being shown in Fig. 2. Also, that any other suitable arrangement of steering device may be used.

The two connecting cables $c$, $c^1$ may run back from the pilot craft $b$ to the parent ship $a$ parallel to one another and near together as shown. For this purpose they may pass over and between guides $b^3$ and $b^4$ (Figs. 2 and 6) at the outer end of a swing arm $b^5$ mounted on the pilot craft $b$ to turn about a vertical axis. This axis may correspond with the axis of the spindle $d^1$, as in the arrangements shown in Figs. 3 and 6, or about a separate vertical axis $b^6$, as in the arrangements shown in Figs. 4 and 5.

In Fig. 3, the pilot craft $b$ is provided with its own power plant at P for driving its propeller $p^2$.

To enable the man in charge of the steering or controlling means on the parent ship $a$ to know or ascertain and direct the course of the pilot craft $b$ in thick or foggy weather or at other times, when the pilot craft can not be seen the cables $c$, $c^1$ may conveniently pass over or through a swing arm $o$ (Figs. 8 and 9) mounted on the parent ship and having radial movement in a horizontal plane. This swing arm will indicate the direction of pull on the cables and enable the course or direction of travel of the pilot craft to be kept steady or altered, as desired. The swing arm $o$ is mounted to turn about a vertical axis $x$ $x$ and carries guide wheels $o^1$, $o^2$ over which the cables $c$, $c^1$ pass to lower guide wheels $o^3$ and thence to steering means below the deck $b^7$ of the parent ship $a$. The said swing arm $o$ may conveniently be mounted near the bow of the parent ship $a$, or, alternatively, at any other convenient place. A single arm, as shown, is preferred for carrying both cables. Indicating means may be associated with the said swing arm, in any suitable way and arranged in any convenient position, to enable the position of the arm $o$, the cables $c$, $c^1$ and of the pilot craft $b$ to be easily and quickly determined. A graduated arc $o^4$, indicated diagrammatically, and by way of example, is arranged near to the swing arm $o$ in Fig. 9, but in practice it will be arranged near to the steersman and be operated from the swing arm.

By means of the two appliances described, namely, the means for giving a predetermined amount of helm to the pilot craft $b$ from a steering appliance on the parent ship and the further means on the parent ship for determining the direction of the pilot craft relatively to the axis of the parent ship $a$ an operator on the parent ship can direct the course of the pilot craft and will know and can determine the course and position of the pilot craft $b$, when such craft may be invisible, as for example, in a fog, or on a dark night.

The mechanism used for coiling up and paying out the cables $c$, $c^1$ at the same speed or at different speeds, according to requirement, can be variously constructed. Conveniently it may comprise, as shown in Figs. 10 and 11, two drums $r$, $r^1$ capable of independent rotation on a common shaft $s$, the said drums being connected by differential or compensating gear comprising in the example, bevel pinions $t$ engaging corresponding bevel toothed wheels $u$ on the drums, the said pinions being carried by a central or intermediate carrier $v$, shown in the form of a ring, mounted on the drum shaft $s$. The pinion-carrying ring $v$ is toothed at its outer periphery and engages with a toothed pinion $w$, or the equivalent, driven by a shaft 1 operated by a motor or otherwise, so that by rotating the said ring $v$, both drums $r$ and $r^1$, when free, will revolve with an even effort in the same direction for paying out or hauling in the two cables equally, and by locking the said ring and rotating one of the said beveled pinions $t$ by means of an endwise movable key 2, connected to a steering wheel 3, or equivalent device, the drums can be revolved in opposite directions so as to pay out one cable and haul in the other.

For paying out or hauling in the pair of cables with both drums rotating in the same direction, each drum may be provided with a brake shown as a brake lever 4. The two brake levers may be operated independently of each other, or, the two brake levers 4 may be so coupled together, as by a connecting bar 5, or the like, that if force be exerted at the center of the said bar, the braking or retarding effect on the two drums $r$, $r^1$ will be equal or by changing the position on the connecting bar or the like at which force is applied the braking effort on the drum can be made greater or less than on the other, in the act of paying out one cable and hauling in the other cable for steering or maneuvering the pilot craft $b$.

According to another arrangement, shown in Fig. 12 there are employed two ordinary drums 6 and 7 mounted on the same shaft 8 and adapted to be rotated together, as by gearing 9, for paying out and hauling in the two cables $c, c^1$ simultaneously. When steering of the pilot craft has to be effected the ends of a chain 11 passing around a pitched controlling or steering wheel 12 are provided with clamps 10, $10^a$ which can be quickly attached to any part of the cables. The wheel 12 is capable of being operated in any usual manner, as by ordinary tooth or worm gear $12^a$. The arrangement is such that when the steering wheel 12 is in operation, there will be sufficient slack left in those portions $c^2$ and $c^3$ respectively of the cables $c, c^1$ between the clamps 10, $10^a$ and the drums 6 and 7 to permit of the forward portions of the cables being freely operated by the controlling or steering wheel 12 and chain 11.

Or, as shown in Fig. 13, a pair of racks 14, $14^a$, one attached to each cable $c$ or $c^1$ by means of clamps 10, $10^a$ and in gear with a pinion 15 between them, will also form a suitable mechanism for operating the steering cables $c, c^1$ in the manner hereinbefore described with reference to Fig. 12, instead of the wheel 12 and chain 11 shown in that figure, the pinion 15 being provided with operating means, as for instance the handle $15^a$.

In the arrangement shown in Fig. 14, the pilot craft $b$ is provided with its own power plant at P for driving a propeller $p^2$ and with a rudder $g^1$ adapted to be operated by the steersman on the pilot craft, as for example by a tiller $g^2$. In this example the pilot craft is connected to the parent ship $a$ by a single cable $c$ that passes over a pulley $o^1$ on a swing arm $o$ on the parent ship from paying out and hauling in mechanism on that ship and over a pulley $b^3$ carried by a swing arm $b^5$ on the pilot craft $b$, the forward end of the cable being made fast to that craft.

When running ahead of a parent ship $a$, the swing arm $b^5$ on pilot craft $b$ would be pointing sternward and have a free radial movement. When bringing the pilot craft alongside the parent ship (Fig. 15), the swing arm $b^5$ will turn until its direction is toward the bow of the pilot craft, as shown at $y$ in Fig. 15. In this position the swing arm could be locked, as for example by a hand operated brake device 13 (Fig. 6), or similar device, and would thus, in effect, cause the point of attachment of the cables $c, c^1$, or cable $c$, as the case may be, to be forward of the center of the pilot craft, thus preventing the said craft being swung around when bringing her alongside the parent ship preparatory to hoisting her inboard on such ship (Fig. 16). This also keeps the bow of the pilot craft in the right or forward direction when the said craft is again lowered or launched from the parent ship, for traveling ahead of such ship, but before launching, the swing arm $b^5$ would be unlocked and brought to point aft so as to let the cables or cable lead backward over the stern of the pilot craft. On taking the water, the pilot craft would go ahead until the cables or cable is or are taut, and when two cables are used, steering could then be again effected from the parent ship as hereinbefore described.

When bringing the pilot craft $b$ alongside the parent ship $a$, the pilot craft would be hauled in to a predetermined distance, and where two steering cables are used, they would then be disconnected from the rudder operating lever $d$ and remain attached only to the swing arm $b^5$ on the pilot craft, which would then be free to take any direction, fore or aft, so as to respond to the direction of the pull on the cables or cable, thus preventing the pilot craft from swinging around and getting wrong end forward in bringing her alongside and inboard the parent craft.

When the length of the cables $c, c^1$ or cable $c$, between the parent ship $a$ and pilot craft $b$ is such that the cables or cable will require to be buoyed, the buoy or float, of each of them, used for this purpose, is preferably so constructed that it can be rapidly attached to and detached from the cables or cable. Such a float may as shown at 14 in Figs. 17 and 18 be of cylindrical form with conical ends, and the cable attachments be arranged on the under part of it, when two cables $c, c^1$ are used, one cable only need be attached to the buoy by one or more quickly closed and opened grip devices so as to cause the buoy to move with the said cable. The other cable may be supported by one or more guides carried by the buoy and through which it can freely run, so that the buoy would be moved by one cable only.

One form of cable grip suitable for the purpose mentioned is shown in Figs. 19 and 20. It comprises a rod 15 mounted to slide endwise in a bearing 16 fixed to one side of the buoy 14 and provided at one end with a jaw $15^a$ in proximity to a jaw $16^a$ on the bearing 16. The other end of the rod is jointed by a pin 17 to a cam 18 provided with a hand lever $18^a$. By turning the cam 18 by its hand lever $18^a$ in the direction of the arrow $z$, the rod 15 will be released so that it can be readily drawn endwise to admit of the cable $c$ being placed between the jaws $15^a$ and $16^a$ and upon turning the cam back into the position shown it will act against the adjacent end of the bearing 16 and move the rod 15 in a direction to cause the cable $c$ to be gripped between the jaws $15^a$ and $16^a$.

In the modified form of clip shown in

Fig. 20, the rod 15 is screw threaded at one end and provided with a nut 20 by operating which in one direction or the other, the jaws 15ᵃ and 16ᵃ can be moved apart or toward one another.

The supporting device on the float for the other cable $c^1$ may, as shown in Fig. 21, comprise a guide wheel 21 fixed to a pin 22 mounted to rotate in a sleeve 23 which is mounted to slide endwise in a bearing 24 carried by the float 14. To admit of the cable $c^1$ being readily placed in position on the guide wheel 21 and retained thereon, the sleeve bearing 24 has fixed to it a lateral projection 25 having on its underside a groove 26 into which the said cable can be placed when the guide wheel with its spindle 22 and sleeve 23 is moved inward as shown in Fig. 21. After this has been done, the guide wheel with spindle and sleeve can be moved outward into the position shown in Fig. 22, so as to be below the groove 26 and cable $c^1$, and be held in that position by means of a locking device, as for example a pin at 27 engaging the sleeve bearing 24 and sleeve 23.

A similar float arrangement with cable grip device may be used with a single cable such as shown in Fig. 14, the guide wheel 21 with bearing 24 and associated parts being then dispensed with.

When attaching a buoy to a cable or cables being run out, and where the said cable or cables would support the buoy until the latter reached the water, it is desirable to prevent the buoy turning over and twisting the said cable or cables. For this purpose the buoy 14 (Figs. 17 and 18) may be provided with a downward extension 28 from its under part, carrying a pendant weight 29 so that the center of gravity of the whole buoy will be below the attachments of the cable or cables to the buoy. Such a weighted downward extension, or there may be more than one, will also serve to stabilize the buoy in the water.

To enable the buoy 14 to be readily placed in position for attachment to the cables $c$, $c^1$, there may be associated with the swinging arm $o$ on the parent ship $a$, means having a vertical movement relative to the said arm and upon which the buoy can be supported while the attachment to the cables is being made. Figs. 8 and 9 show means of this kind comprising a lever 30 adapted, as shown, to support the float 14, and pivoted to the swinging arm $o$ at 30ᵃ. The forward end of the lever is made of fork shape as shown in Fig. 9 to adapt it to support a float 14 having a dependent weight 29. The rear end of the said lever is counterbalanced as at 31, or otherwise controlled, so that it can normally be held in the position shown in dotted lines in Fig. 8, so as to support a buoy 14 thereon clear of the cable or cables but can be moved into the position shown in full lines in the said figure, when it is required to attach the buoy to the cable or cables which can then readily be done in the manner hereinbefore described. In bringing a buoy inboard for detachment from the cable or cables, it would be hauled on to the forward part of the lever 30 while this part of the lever is depressed into the full line position shown in Fig. 8, and then disengaged from the cable or cables and raised clear thereof by moving the lever into the said dotted position shown in the said figure.

For the purpose of detecting shoal water, the pilot craft $b$ may be provided with any known or suitable means such as a sounder, adjustable or otherwise, indicated at 33 in Fig. 2, which may depend from it and which on contact with the sea bottom, would send a signal to the parent ship, or alternatively, if the pilot craft struck an obstacle, contact mechanism on the hull of the pilot craft would indicate the fact, and signaling to the parent ship may be effected for example by making or breaking a circuit through one or each of the connecting cables $c$, $c^1$, which action would register itself on the parent ship; or the detector on the pilot craft may release a siren trigger, fire a detonator or ignite a flare or the like on the pilot craft. Sounder or contact mechanism suitable for the purposes mentioned may be readily adapted in view of the numerous devices of this kind heretofore proposed and no claim is made in respect thereof.

What I claim is:—

1. For the protection of a parent ship, the combination with such ship of a pilot craft, propelling mechanism thereon, a cable connecting said ship and pilot craft, and a swing arm mounted to turn about vertical axes on said ship and pilot craft and each engaging said cable so as to respond to variations in the direction of pull of said cable.

2. For the protection of a parent ship, the combination with such ship of a pilot craft, propelling mechanism thereon, a cable connecting said ship and pilot craft, swing arm mounted to turn about vertical axes on said ship and pilot craft and each engaging said cable so as to respond to variation in the direction of pull of said cable and means on said ship for indicating the angular position of the swing arm thereon in relation thereto.

3. For the protection of a parent ship, the combination with such ship of a pilot craft, power plant and propelling mechanism thereon, a cable connecting said ship and pilot craft, and swing arms mounted to turn about vertical axes on said ship and pilot craft and engaging said cable and by which they will be moved about their axes upon change in the direction of pull of the cable.

4. For the protection of a parent ship, the combination with such ship of a pilot craft, propelling mechanism thereon, a cable connecting said ship and pilot craft, swing arms mounted to turn about vertical axes on said ship and pilot craft and engaging said cable and by which they will be moved about their axes upon change in the direction of pull of the cable, and indicating means on said ship for indicating the angular position of the swing arm thereon.

5. For the protection of a ship the combination with such ship of a pilot craft, propelling mechanism thereon, a pair of steering cables connecting said ship and pilot craft, swinging means mounted on said parent ship to turn horizontally to right or left and with which said connecting cables engage and steering means on said ship adapted to vary the pull on said connecting cables and thereby steer the pilot craft.

6. For the protection of a ship, the combination with such ship of a pilot craft propelling mechanism thereon, a pair of steering cables connecting said ship and pilot craft, swinging means mounted on said parent ship to turn horizontally to right or left and with which said connecting cables engage and means on said ship whereby said cables can, at will be paid out simultaneously, or hauled in simultaneously, or either of them can be paid out while the other is hauled in.

7. For the protection of a ship, the combination with such ship of a pilot craft propelling means thereon, a pair of steering cables connecting said ship to parts on the pilot craft at opposite sides of the center line thereof, swinging means mounted on said ship to turn horizontally to right or left and engaging said connecting cables and by which such swinging means will be moved angularly and steering means on said ship whereby said pilot craft can be steered therefrom through said cables.

8. For the protection of a ship, the combination with such ship of a pilot craft propelling mechanism thereon, a swing arm mounted to turn about a vertical axis on said ship, a swing arm mounted to turn about a vertical axis on said pilot craft, a pair of connecting cables between said parent ship and pilot craft and engaging the swing arms on both ship and pilot craft, said swing arms being adapted to be moved angularly by said cables upon change in the direction of pull thereof and the forward ends of said cables being splayed apart after passing the outer end of the swing arm on said pilot craft and connected to parts of the pilot craft at opposite sides of the center line thereof, and steering mechanism on said ship whereby said pilot craft can be steered through said cables.

9. For the protection of a ship, the combination with such ship, of a pilot craft, propelling mechanism thereon, a pair of connecting cables between said ship and pilot craft, swing devices mounted to turn about vertical axes on said ship and pilot craft respectively and with which said connecting cables engage so that they will be moved angularly about their axes upon change in the direction of pull of said cables, a transverse arm on said pilot craft the forward ends of said cable being splayed apart laterally after passing the outer end of the swing device on said pilot craft and connected to parts of the transverse arm located at opposite sides of the fore and aft center line of said pilot craft and steering mechanism on the ship whereby the pilot craft can be steered through said cables.

10. For the protection of a ship, the combination with such ship, of a pilot craft, propelling mechanism thereon, a pair of connecting cables between said ship and pilot craft, swing arms mounted to turn about vertical axes on the ship and pilot craft and engaged by said cables so as to be moved angularly thereby upon change in the direction of pull thereof, a steering device mounted to turn about a vertical axis in the fore and aft center line of the pilot craft, the forward ends of said cables, after leaving the outer end of the swing arm on said pilot craft, being splayed apart and connected to opposite lateral portions of said steering device, steering means on said pilot craft connected to and operated by said steering device and steering means on said ship whereby the steering means on said pilot craft can be operated through said cables.

11. In ship protecting means according to claim 10 the combination with the steering device on the pilot craft of means adapted to offer a yielding resistance to turning movement of the steering device on said pilot craft in either direction after the steering device has been moved to some extent, for the purpose set forth.

12. In ship protecting means according to claim 10 the combination with the steering device on the pilot craft of spring means adapted to offer resistance to turning movement of the steering device on said pilot craft in either direction for the purpose set forth.

13. In ship protecting means according to claim 10 the combination with the swing arm on said pilot craft of means whereby the said arm can, when desired, be locked in position for the purpose set forth.

14. For the protection of a ship at sea the combination with such ship of a pilot craft, propelling mechanism thereon, a pair of connecting cables between said ship and pilot craft, swing arms mounted to turn about vertical axes on said ship and pilot craft respectively and with which said cables engage so as to move them angularly upon change in the direction of pull of said cables, steering means on said pilot craft comprising a transverse lever mounted to turn about a vertical axis in the fore and aft center line of the pilot craft, a second transverse lever rigidly connected to the first mentioned lever, a third transverse lever mounted to turn about another vertical axis in the fore and aft center line of the pilot craft, a rudder connected to the said third lever, connecting means between the second and third levers and steering means on the ship whereby the steering means on the pilot craft can be operated through said connecting cables.

15. In ship protecting means according to claim 14, the combination with the steering means on the pilot craft of spring devices arranged to resist operation of said steering means in either direction.

16. For the protection of a ship, the combination with such ship of a pilot craft, propelling mechanism thereon, a pair of connecting cables between said ship and pilot craft and having their forward ends connected to parts on the pilot craft located at opposite sides of the fore and aft center line thereof, a swing arm mounted on said ship to turn angularly in a horizontal plane and in engagement with said cables and steering mechanism on said ship whereby said pilot craft can be steered through said cables, said steering mechanism being adapted to admit of both cables being paid out, or hauled in, or of one of them being paid out while the other is hauled in.

17. For the protection of a ship, the combination with such ship of a pilot craft, propelling mechanism thereon, a pair of connecting cables between said ship and pilot craft and having their forward ends connected to parts on the pilot craft located at opposite sides of the fore and aft center line thereof, swinging means mounted on said ship to swing in a horizontal plane and in engagement with said cables and steering mechanism on said ship whereby said pilot craft can be steered through said cables, said steering mechanism comprising two drums mounted to turn independently of one another and around which the two cables are respectively wound, differential gearing embodying a rotary carrier and toothed wheels mounted to turn therein and in gear with the two drums, means for rotating said carrier, means for holding either or both of said drums stationary at will, and means for rotating any one of the toothed wheels when said carrier is held stationary.

18. Ship protecting means according to claim 17, wherein the means for holding either or both of the drums stationary comprises brake devices engaging said drums, levers for operating said brake levers and a transverse rod connecting said levers whereby said levers and brake devices can be operated similarly or differentially according to the point of application of force to the transverse rod.

19. For the protection of a ship, the combination with such a ship of a pilot craft, propelling mechanism thereon, a cable connecting said ship and pilot craft, a float for buoying said cable and means whereby said float can be readily attached to and detached from said cable.

20. For the protection of a ship, the combination with such ship of a pilot craft, propelling mechanism thereon, cables connecting said ship and pilot craft, a float for buoying said cables, a grip device on said float to grip one of said cables and guiding means on said float adapted to support the other cable and admit of such cable freely moving past it.

21. For the protection of a ship, the combination with such ship of a pilot craft, propelling mechanism thereon, cables connecting said ship and pilot craft, a float for buoying said cables, grip devices on said float to engage one of said cables, each grip device comprising a pair of jaws and means for readily moving them toward and from each other to respectively grip and release one of said cables, and guiding means on said float to support the other cable, said supporting means each comprising relatively movable parts capable of being moved into a position to surround and support said second cable while leaving it free to move between them, and of being moved into another position to admit of the cable being placed between them or removed therefrom by lateral movement of said movable parts relatively to the cable.

22. For the protection of a ship, the combination with such ship of a pilot craft, propelling mechanism thereon, cables connecting said ship and pilot craft, a float for buoying said cables, means on said float for gripping one of said cables, supporting means on the said float for supporting the other cable in such manner that the latter can move endwise in relation to said float, and a weight suspended from said float.

23. For the protection of a ship, the combination with such ship of a pilot craft, propelling mechanism thereon, a cable connecting said ship and pilot craft, a swing arm mounted on said ship to turn about a vertical axis and engage said cable and a lever pivoted on said arm to turn about a horizontal axis and adapted to support a float while being attached to or detached from said cable.

24. For the protection of a ship, the combination with such ship of a pilot craft, propelling mechanism thereon, cables connecting said ship and pilot craft, a swing arm mounted on said ship to turn about a vertical axis and engage said cables and a lever pivoted on said swing arm to turn about a horizontal axis, its rear part being weighted and its forward part being of fork shape to adapt it to support a float with dependent weight, while being attached to and detached from said cable.

Signed at London, England, this 25th day of July, 1919.

JOHN PEARCE ROE.